United States Patent Office 3,051,657
Patented Aug. 28, 1962

3,051,657
PROCESS OF DECREASING THE SALT CONTENT OF AN ACIDIC SILICA HYDRO-ORGANOSOL
Wilson H. Power, Des Peres, Mo., assignor to Monsanto Chemical Company, St. Louis, Mo., a corporation of Delaware
No Drawing. Filed Sept. 19, 1958, Ser. No. 761,957
16 Claims. (Cl. 252—306)

The present invention relates to acidic silica sols which are substantially free of salts, and to processes of producing acidic silica sols which are free of salts or have a very low salt content. The present invention also relates to silica aerogels which are substantially free of salts and to processes of producing silica aerogels which are free of salts or have a very low salt content.

It has been proposed heretofore in the United States Patent No. 2,285,477 to John F. White, patented June 9, 1942, to prepare acidic silica alcosols, and silica aerogels from acidic silica alcosols. According to this White patent an acidic aqueous colloidal silica solution is first prepared by mixing a mineral acid and an alkali silicate solution at a pH of about 1.8 to 4.5. Before the resulting sol has solidified to the gel form, an organic solvent (for example, ethanol), miscible with water, is added to give a mixed hydro-organosol. The addition of this organic solvent and cooling of the sol causes a substantial portion of the inorganic salt to precipitate, and upon removal of the precipitated salt a sol is obtained which varies in stability depending on the pH of the sol, the amount of inorganic salt remaining in the sol and the temperature at which the sol is stored. In any event, the sols thus obtained have limited stability, usually varying from an hour or less up to about 2 weeks, and hence are considerably less stable toward gelation than alkaline silica aquasols which usually have a stability of several months and longer at normal room temperatures. The alcosols of the White patent may be autoclaved in the same way that the alcogels are treated by the process of United States Patent No. 2,093,454 to Samuel S. Kistler, patented September 21, 1937, to give an aerogel product.

The hydro-organosols of the White patent contain varying amounts of inorganic salt depending on the acid and silicate employed, the concentration of organic solvent and silica in the sol, the temperature of the sol and other factors. However, the minimum inorganic salt concentration in the sol is about 0.1 to 0.3% by weight based on the sol. This salt content is objectionable for certain uses of the sol, for example, when it is desired to produce a silica coating or film having low electric conductivity or water-sensitivity, from the sol. Moreover, when the sol is autoclaved to form a silica aerogel, the minimum quantity of inorganic salt is about 1 to 3% by weight on the aerogel. Because of this relatively high electrolyte content the aerogel is not entirely satisfactory as a filler in silicone rubbers which are to be used as electric insulating materials, or in other applications where low electric conductivity is essential. The above remarks with respect to the sols of the White patent, and the aerogels produced therefrom, also apply to the acidic hydro-organosols produced by the process of the United States Patent No. 2,285,499 to Morris D. Marshall, patented June 9, 1942, and to the aerogels prepared from such sols.

In the Kistler patent referred to above, reference is made to the preparation of silica aerogels from silica alcogels. According to this patent a silica hydrogel is first prepared from sodium silicate acidified with sulfuric acid. The silica hydrogel is washed with water and the water in the hydrogel is then replaced by a water-miscible liquid having a lower critical temperature than water, for example, ethanol, to form a silica alcogel. This alcogel is charged to an autoclave which is nearly filled with liquid, the liquid being the same as that contained in the alcogel, and the autoclave is then closed. The whole mass in the autoclave is then slowly heated until the temperature exceeds the critical temperature of the liquid in the autoclave, during which time only enough vapor is released to prevent excessive pressures but not enough vapor is released to produce substantial drying of the gel. The gas in the autoclave is then released at a rate insufficient to damage the gel. The resulting gel, which is an aerogel, occupies substantially the same volume as the alcogel from which it is prepared.

The aerogels produced according to the process of the above Kistler patent contain some quantities of salts which make them generally unsuitable for certain uses, particularly where the material is used in electrical insulators. This is due to the circumstance that the starting hydrogel contains salt which is held tenaciously by the gel structure and it has been found to be virtually impossible to remove substantially all or all of the salts present in the silica hydrogel by washing with water using conventional techniques. It has also been found that it is impossible to rid the hydrogel of metallic cations by using wash water of ordinary hardness because the silica hydrogel absorbs metallic cations from such wash water.

The present invention relates to an improvement on the processes and products disclosed in the White, Marshall and Kistler patents hereinbefore referred to. In accordance with the present invention it is possible to remove all or substantially all of the salt from an acidic silica hydro-organosol, and it is also possible to prepare from the resulting sol silica aerogels which are free or substantially free of salts or other electrolytes. The resulting aerogels have a utility in electrical insulating compositions which is not shared by the silica aerogels of the prior art referred to above.

It is, accordingly, one object of this invention to provide acidic silica hydro-organosols, particularly acidic silica ethanol-aquasols, which are free or substantially free of salts.

It is a further object of this invention to provide a process of producing acidic silica hydro-organosols, particularly acidic silica ethanol-aquasols, which are free or substantially free of salts.

It is a further object of this invention to provide silica aerogels which are free or substantially free of salts and contain no or inappreciable amounts of other electrolytes.

It is a further object of this invention to provide a process of producing silica aerogels which are free or substantially free of salts from acidic silica hydro-organosols, particularly acidic silica ethanol-aquasols.

Still further objects and advantages of this invention will become apparent from the following description and the appended claims.

In my copending application Serial No. 549,872, filed November 29, 1955, now abandoned which is a continuation-in-part of my application Serial No. 451,299, filed August 20, 1954, now abandoned, there is described a process of producing an acidic silica hydro-organosol of extremely low salt content by contacting an acidic silica hydro-organosol containing a mineral acid and varying amounts of a salt of a mineral acid and an alkali silicate, say amounts of 0.1 to 0.6% by weight, with the hydrogen form of a water-insoluble, strong cation-exchange material and a volatile organic acid salt of a water-insoluble, weak anion-exchange material containing a plurality of salt-forming nitrogen atoms, the contacting with each exchange material being done simultaneously or in any desired sequence, until the acidic hydro-organosol is free or substantially free of such salt. The resulting sol is not only substantially salt free, but has an acidity which is due primarily to the presence of a volatile organic acid which has been substituted for at least part of the mineral acid present in the original or starting sol. The substantially salt-free sol has a variety of uses, but it is particularly suitable for the preparation of substantially electrolyte-free silica aerogels which can be used as fillers in silicone rubbers used for electrical insulating purposes, While sols and aerogels of the type described in said copending applications are desirable and have excellent utility for a wide variety of purposes, there are instances where it is desired to use acidic silica hydro-organosols which are free or substantially free of salts and are free or substantially free of organic acids. The present invention is directed to the preparation of the latter type of sols.

In my copending application referred to above, it is indicated therein that the base form of anion-exchange materials, in general, and also the base form of weak anion-exchange materials, are generally unsuitable for use in removing anions of mineral acids from acidic silica hydro-organosols containing a salt of such acid and an alkali. This is generally true, but in accordance with my copending application Serial No. 547,835, filed November 18, 1955, now abandoned it is possible to employ the base form of weak anion-exchange materials to substantially reduce the anion concentration of mineral acid anions in an acidic hydro-organosol by the use of such exchange material under certain specified conditions. More specifically, in accordance with said copending application, it is possible to remove all or substantially all of the residual dissolved salt in an acidic silica hydro-organosol by contacting such a sol with a strong cation-exchange material which is capable of absorbing metallic cations from an acidic hydro-organo solution and with the base form of a weak anion-exchange material containing a plurality of salt-forming nitrogen atoms provided that the pH of the sol does not exceed 4.5 during contact with such exchange materials. The above copending application provides a process capable of producing an acidic hydro-organsol substantially free of dissolved salts such as, for example, sodium sulfate and having a pH of about 2.5 to 4.5 due primarily to the presence of a mineral acid and/or acid salt thereof such as sulfuric acid and/or sodium hydrogen sulfate and the like, present in the starting sol. While such process provides desirable results, it is not as economical as could be desired since the cost of regenerant chemicals (alkali materials) for converting the anion-exchange material after it has lost is capacity to economically absorb or sorb further mineral acid anions, to the base form of such material plus the cost of equipment necessary to handle and employ the regenerant chemicals contribute a significant amount to the capital and other costs required to operate the process. The present invention provides an improvement over the process described in the above copending application Serial No. 547,835 in providing a process which materially reduces the cost of regenerating the exchange materials employed by the use of a water-insoluble anion-exchange material in sulfate form, as will more fully be described hereinafter.

In accordance with the present invention, it is possible to remove all or substantially all of the residual dissolved salt in an acidic silica hydro-organosol, without a substantial decrease in the acid content of such sol, by contacting such a sol with a strong cation-exchange material which is capable of absorbing metallic cations from an acidic hydro-organo solution and with the sulfate form of an anion-exchange material containing a plurality of salt-forming nitrogen atoms provided that the pH of the sol does not exceed 4.5 during contact with such exchange materials. The resulting sols have a pH of about 2.5 to 4.5 due primarily to the presence of a mineral acid and/or acid salt thereof such as sulfuric acid and/or sodium hydrogen sulfate and the like present in the original sol. If an aerogel is desired, the liquid phase of the sol is removed without subjecting the gel, formed from the sol during heating, to compressive forces which could cause appreciable shrinkage of the gel.

In carrying out the process of this invention, it is possible to contact the salt containing acidic silica hydro-organosol with the anion and cation-exchange materials simultaneously or in any sequence, although it is definitely preferred to use a mixture of the materials or to contact the cation-exchange material first, provided the pH of the sol does not exceed 4.5 and the pH does not drop below certain pH values as hereinafter described. After the anion-exchange material is partially converted to the bisulfate form or has become exhausted, that is, incapable of removing further mineral acid anions from the sol or incapable of removing such anions economically, the material can be regenerated, that is, converted to the sulfate form, very easily and economically. This can be accomplished if the material is in the bisulfate form by simply washing with water, or if it is in a chloride or phosphate salt form, it can be regenerated to the sulfate form with a sodium sulfate solution obtained by regeneration of the cation-exchange resin and washing with water. Thus, there is no need to employ chemical regenerants other than water or the regenerant obtained from the cation-exchange regeneration.

Although it is known that salts can be removed from aqueous solutions thereof by contacting such solutions with cation and anion-exchange materials, it could not be predicted or foreseen that the removal of dissolved inorganic salts from acidic silica hydro-organosols could be accomplished by the use of the cation-exchange and anion-exchange materials employed herein due to the tendency of such sols to gel rapidly with relatively slight upward changes in pH, and also due to the tendency of the silica and/or silicic acid in such sols to be absorbed on the anion-exchange materials, particularly when it is considered that the base form of strongly basic anion-exchange materials has been previously used to remove silica or silicic acid from aqueous solutions. However, the present invention provides a practical and economical process for removing salts from such sols, without materially changing the acid content thereof, which process avoids gelation of the sol for practical periods of time and minimizes the absorption of colloidal silica and/or silicic acid by the anion-exchange material even though the anion-exchange material is strongly basic in its base form.

The initial or starting acidic silica hydro-organsols employed in this invention can be, and preferably are, prepared according to the processes described in the White and Marshall patents hereinbefore referred to. The processes of these patents comprise, in general, first forming an acidic sol having a pH between 1.8 and 4.5 by acidifying a water-soluble alkali silicate such as sodium silicate with a mineral acid such as sulfuric acid, in the proper proportions to give such a pH, and then adding a water-miscible organic liquid such as ethanol to the aquasol to precipitate a substantial amount of the salt formed by the reaction of the silicate and the acid (as in the above Marshall patent), which sol may be cooled to precipitate further quantities of salt (as in the above White patent). The salt is then separated from the sol by any suitable removing operation such as filtration, centrifugation or the like, to form the initial or starting sols of this invention. These initial sols contain at least 0.1% by weight of salt and can contain as much as 5% by weight of salt in some instances. Even the minimum amount of salt makes the sols unsatisfactory for some uses, for example, in the formation of coatings or films where low electric conductivity or low water sensitivity is required. Such initial sols are also unsatisfactory in the preparation of aerogels which must be free or substantially free of electrolytes. The initial sols are usually prepared at a temperature between 0 and 15° C., but preferably at a temperature between 3 and 12° C. However, they can be contacted with the cation and anion-exchange materials hereinafter described at temperatures below 30° C., for example at temperatures of 0–30° C., although temperatures of 0–20° C. are more satisfactory. The initial sols preferably have a pH between 2 and 4 and an SiO₂ content, as silicic acid, of about 5 to 12% by weight.

In a preferred form or embodiment of this invention, the starting or initial acidic silica hydro-organosols are prepared by first reacting an aqueous solution of sodium silicate and aqueous sulfuric acid at a temperature between about 0 and 15° C. in such proportions and concentrations to provide an acidic silica aquasol having a pH of about 2 to 4 and containing sodium sulfate and from about 12 to 20% by weight of $SiO_2$ as silicic acid. The aquasols having a silica content over 17% by weight generally must be kept at 0–5° C. to prevent rapid gelation.

The silica aquasol thus obtained is maintained at a temperature of about 0–15° C. and a water-miscible organic liquid such as ethanol is mixed therewith to form a silica hydro-organosol containing from about 25 to 60% by weight, preferably 40 to 60% by weight, of the organic liquid and from about 5 to 11% by weight of $SiO_2$ as silicic acid. The sodium sulfate is substantially insoluble in the above sol and is thus precipitated to a substantial extent as $Na_2SO_4 \cdot 10H_2O$. On removal of this precipitated sodium sulfate by centrifugation or filtration or decantation of the sol, or the like, a sol is obtained which contains from about 0.1 to 0.6% by weight of $Na_2SO_4$ depending on the concentration of the organic liquid in the sol and the temperature of the sol.

The water-miscible organic liquid employed in preparing the initial or starting sols used in this invention can have a boiling point above that of water at atmospheric pressure if the sol is to be used, for example, in the treatment of textiles or paper. For example, the higher boiling water-miscible organic liquids such as diethylene glycol, ethylene glycol, 2-ethoxyethanol, methoxyethanol, 2-butoxyethanol, monomethyl ether of diethylene glycol, monomethyl ether of diethylene glycol or monobutyl ether of diethylene glycol or the like may be employed in such instances. With this type of organic liquid those which consist of carbon, hydrogen and oxygen atoms are preferred. However, if the sols are to be employed to produce aerogels, it is necessary to employ water-miscible organic liquids, preferably those consisting of carbon, hydrogen and oxygen atoms, which have a boiling point below that of water at atmospheric pressure. As examples of suitable liquids of this category may be mentioned methanol, ethanol, isopropanol, tertiary butyl alcohol or the like. The preferred organic liquids or diluents are ethanol and acetone. The organic liquid used should be substantially neutral.

In accordance with the present invention, the residual or dissolved salt in the initial or starting acidic silica hydro-organosols is substantially all removed by contacting such sols with a water-insoluble strong cation-exchange material which is capable of exchanging hydrogen ions for metallic cations in an acidic hydro-organo solution whereby the metallic cations of the salt are taken up, absorbed or sorbed by the cation-exchange material which releases hydrogen ions to the solution, and by contacting such sols with the sulfate form of a water-insoluble anion-exchange material, preferably a strong anion-exchange material, having a plurality of salt-forming nitrogen atoms, which material is capable of absorbing or sorbing mineral acid anions, from an acidic hydro-organo solution containing such anions, thereby being at least partially converted to the bisulfate form, under such conditions that the pH of the sols does not exceed 4.5, and is generally in the range of 2.5 to 4.0 after contact with the exchange materials is completed. The resulting sol contains less than 0.05%, preferably less than 0.025%, by weight of residual or dissolved salt, and all or a major portion of the mineral acid and/or an acid salt thereof present in the initial or starting sols. Thus, the resulting sol can be employed under certain conditions as hereinafter described to form aerogels containing less than 0.4%, preferably less than 0.1%, by weight of electrolyte.

The reaction between the metallic cations in the sol and the cation-exchange material may be represented by the following equation:

$$M^+ + HR \rightarrow MR + H^+$$

where $M^+$ is a metallic cation and R is the water-insoluble portion of the cation-exchange material. It is apparent from this equation that the cation-exchange material employed herein is used in the hydrogen form or is operated on a hydrogen cycle. When this material is no longer capable of removing metallic cations from the sol it can be, and usually is, regenerated by treatment with a mineral acid such as sulfuric acid or hydrochloric acid to convert it to the hydrogen form. The regenerating acid solution is thus at least partly converted to a solution containing some mineral acid and the salt of the anion of such acid and the metallic cation, for example, a salt such as sodium sulfate or sodium chloride. The cation-exchanger material must be a "strong cation-exchange material" by which term is meant a material which will remove metallic cations from hydro-organo solutions at a pH as low as 2. These materials are of a resinous nature and are characterized by water-insolubility. They are electrolytes having an enormous non-diffusible anion and a simple diffusible cation. It is preferred that the cation be a sulfonic acid group which includes nuclear sulfonic acid groups as well as alkylene sulfonic acid groups. As examples of sulfonic acid cation-exchange resins are the water-insoluble phenolic methylene sulfonic resins such as those obtained by reacting phenol, formaldehyde and sulfuric acid or an alkali metal sulfite such as those described in U.S. 2,477,328. Still other sulfonic acid cation exchange resins are the water-insoluble vinyl aromatic compounds containing nuclear sulfonic acid groups such as those described in U.S. 2,366,007. One of the preferred cation-exchange resins for use in accordance with this invention is the water-insoluble aromatic hydrocarbon copolymer of a monovinyl aromatic hydrocarbon and a polyvinyl aromatic hydrocarbon, for example styrene and divinyl benzene, containing nuclear sulfonic acid groups, e.g. the commercially available material designated "Dowex" 50 which is fully described as to its characteritsics, properties and chemical constitution in volume 69, p. 2830, of the Journal of the American Chemical Society, November 1947. The preparation of such materials and the chemical constitution thereof is described in U.S. 2,466,675. In general the cation exchange materials which have a titration curve similar to that shown in Figure 1, on page 88 of "Analytical Chemistry," volume 21 (1949) are satisfactory. The preferred cation-exchange materials have a capacity of at least 1, and preferably at least 2.5, milligram equivalents per gram of dry material.

The reaction between the mineral acid anions in the sol and the base form of a weak anion-exchange material may be represented by the following equations which probably represent the equilibria conditions:

(I)  $H_2SO_4 + 2R_1-(NH_2)_x \rightarrow [R_1-(NH_3)_x]_2SO_4$ (II) $[R_1-(NH_3)_x]_2SO_4 + H^+A^- \rightarrow$
       $R_1-(NH_3)_xHSO_4 + R_1-(NH_3)_xA$ where $A^-$ is the anion of a mineral acid, for example $Cl^-$, $SO_4^{--}$, $HSO_4^-$, $PO_4^{---}$ and $HPO_4^{--}$, and $R_1(NH_2)_x$ is the water-insoluble portion of the anion-exchange material. Thus, the above equations illustrate the absorption or removal of mineral acid anions in the hydro-organosol by the use of the sulfate form of an anion-exchange material composed of a plurality of salt-forming nitrogen atoms, for example, amino groups or imino groups. The anion-exchange material employed herein is "the sulfate form of an anion-exchanger" by which term is meant a water-insoluble material which will readily adsorb or remove mineral acid anions from a hydro-organo solution at a relatively low pH, say a pH between 2 and 4.5 (glass electrode), but will only remove such anions slowly as the pH approaches 7.0. Either the sulfate form of a weak anion-exchanger material or the sulfate form of a strong anion-exchange material can be used, but is definitely preferred to employ the sulfate form of a strong anion-exchange material since such material is regenerated, after it becomes exhausted, much more quickly and cheaply than is the case if the sulfate form of a weak anion-exchange material is employed. In contrast to the foregoing, the base form of a strong anion-exchange material, which removes mineral acid anions from the sol at a pH above 7, cannot be employed since such material removes, adsorbs or sorbs silica and/or silicic acid as well as mineral acid anions from the sol with a consequent loss of silica from the sol and loss of capacity of the anion-exchange material.

It will also be noted from Equation II that the removal of mineral acid anions from the sol will result in an increase in the pH of the sol. If the pH of the sol exceeds 4.5, the stability of the sol is adversely affected and the sol will tend to form an irreversible gel within a short period of time and hence will become unsuitable for further handling and use. If the gel forms in a bed of anion-exchange material, it will render the bed inoperative for further use until extensive cleaning of the bed is undertaken. Hence, it is essential in the practice of this invention that the pH of the sol in contact with the sulfate form of the anion-exchange material should not be allowed to exceed 4.5. As will be seen from the description herein this can be accomplished by the sequence in which the cation-exchange material and anion-exchange material are employed and/or by the rate of flow of the sol through a bed of the anion-exchange material.

By using the sulfate form of a water-insoluble anion-exchange material under the conditions described herein, it is possible to obtain the proper pH values in the sol, and the resulting sol is sufficiently fluid for further operations such as pumping, temporary storage and the like.

As examples of the anion-exchange materials which may be employed in this invention may be mentioned the sulfate form of weak anion-exchange materials such as water-insoluble copolymers of styrene and divinylbenzene containing nuclear amine groups, for example, products such as described in U.S. Patent No. 2,366,008, or containing polyalkylamine groups; water-insoluble polymerized reaction products of an aromatic amine, for example, metaphenylene diamine and formaldehyde; water-insoluble polymerized reaction products of an alkylene polyamine, such as ethylene diamine, diethylene triamine and the like, with phenol and formaldehyde, for example, products such as those described in U.S. Patent No. 2,341,907; and resinous reaction products, such as those described in U.S. Patent No. 2,591,574, of a primary amine or a secondary amine or mixtures thereof and an insoluble, cross-linked copolymer of an aromatic monovinyl hydrocarbon and an aromatic divinyl hydrocarbon, which copolymer contains haloalkyl groups having the formula $-C_nH_{2n}X$, wherein X is a chlorine or bromine atom and $-C_nH_{2n}-$ is an alkylene group in which $n$ is an integer of a value from one to four. As examples of commercially available weak anion-exchange materials of the latter type of product may be mentioned "Dowex" 3 or "Amberlite" IR–45. In general, the base form of a suitable weak anion-exchange materials has a titration curve similar to that of Figure 6 on page 8 of "Encyclopedia of Chemical Technology," Volume 8 (1952), published by the Interscience Encyclopedia, Inc., New York. Such materials generally contain a plurality of

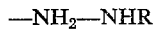

or $-NR_2$ groups, where R is an aliphatic radical.

The preferred class of anion-exchange materials for use in the processes described herein are the sulfate form of strong anion-exchange materials including the sulfate form of strongly basic quaternary ammonium anion-exchange material resins. As examples of particular resins or materials which may be used may be mentioned the sulfate form of the water-insoluble resinous reaction product of a tertiary monoamine and a halomethylated copolymer of a monovinyl aromatic hydrocarbon and a divinyl aromatic hydrocarbon, such as the resinous reaction products described in U.S. Patent No. 2,591,573; the sulfate form of the water-insoluble reaction product of a tertiary monoamine such as trimethylamine and a chloromethylated copolymer of a mixture of styrene, aralkyl vinyl aromatic hydrocarbon and a divinyl aromatic hydrocarbon, of which the commercially available "Dowex" 1 is an example; and the sulfate form of the water-insoluble resinous reaction product of a tertiary mono- or di-alkyl N-substituted alkanol and alkanediol amines with a vinyl-aromatic resin having halomethyl radicals attached to its aromatic nuclei, for example, the resinous reaction products described in U.S. Patent No. 2,614,099. In general, the base form of the suitable strong anion-exchange materials has a titration curve similar to that of Figure 7 on page 8 of "Encyclopedia of Chemical Technology" Volume 8 (1952), published by the Interscience Encyclopedia, Inc., New York. The sulfate form of the anion-exchange material employed should have a capacity of at least 0.5, preferably at least 1.5 milligram equivalents per gram of dry resin.

When the sulfate form of the anion-exchange material has been used to the extent that it is no longer capable of removing mineral acid anions from the sol or is no longer capable of removing such anions efficiently, it has been converted in part to the bisulfate form. However, it can be regenerated readily, that is, converted to the sulfate form, by suitable treatment with water per se. Thus, when the anion-exchange material has been used to remove or absorb sulfate ions from the sol, the material is readily regenerated or converted to the sulfate form by washing a bed of the anion-exchange material with water. This washing may be carried out concurrent or counter-current to the direction of flow of the sol through the bed. On the other hand, when the anion-exchange material has been used to remove or absorb mineral acid anions other than sulfate anions from the sol, it is usually necessary to regenerate the anion-exchange material to the sulfate form by washing a bed thereof with water the flow of which is counter-current to the direction of that of the sol through the bed. Since the wash water which is used to regenerate the anion-exchange material displaces mineral acid from the anion-exchange material, such wash water may be used to at least partially regenerate the cation-exchange material to the hydrogen form. While the amount of acid in the water is usually not sufficient for complete regeneration of the cation-exchange material, usually less than half of the acid normally required to regenerate such material need be supplied in addition to that in the wash water, thus effecting a considerable saving in the cost of the chemical regenerants for the exchange materials.

The regeneration of the bisulfate form of the strongly basic anion-exchange material to the sulfate form with water can be carried out in less time and with less water than is required in the regeneration of the corresponding weakly basic anion-exchange material. It is primarily for this reason that the use of the sulfate form of the strongly basic anion-exchange material is preferred in the processes of this invention.

In regenerating the anion-exchange materials, it is desirable to use relatively pure water, that is, distilled water, demineralized water, for example, water which has been passed through cation- and anion-exchange materials or natural water having a $CaCO_3$ hardness less than 40 p.p.m.

In carrying out the processes of this invention, it is important, as previously noted herein, that the pH of the hydro-organosol be controlled during removal of the dissolved salt cations and anions in the sol in order to avoid gelation of the sol, and also to remove such cations and anions as efficiently and as completely as possible. The pH conditions existing in the sol during cation and anion removal vary to some extent depending on the order in which the cation- and anion-exchange materials are employed or whatever they are used simultaneously. If the starting hydro-organosol is first contacted with the anion-exchange material the pH of the starting sol rises due to the removal of mineral acid anions from the sol. In order to avoid gelation of the sol, it is essential to remove the sol from contact with the anion-exchange material before the pH of the sol exceeds 4.5. Accordingly, it is not practical to use an acidic silica hydro-organosol at a pH of about 3.5 to 4.0 when such sol is to be contacted first with the anion-exchange material since only relatively small amounts of mineral acid anion can be removed from such sol before the pH of the sol exceeds 4.5. It is preferable, in order to obtain greater efficiency of the anion-exchange material, to employ an acidic hydro-organosol having a pH of about 1.8 to 3.5, and preferably a pH between about 1.8 and 3.0. In such instances, the sol can be maintained in contact with the anion-exchange material until the pH of the sol increases, but does exceed 4.5. Usually satisfactory removal of the mineral acid anion is obtained when the pH of the sol is in the range of 3.5 to 4.5, preferably 3.5 to 4.0 and the sol is then removed from contact with the anion-exchange material.

The resulting sol is then contacted with the strong cation-exchanger to remove metallic cations from the sol and this results in a decrease in pH of the sol below 3.5, and usually between 1.8 and 3.3. If the resulting acidity of the sol is objectionable the pH of the sol can be increased by again contacting the sol with the sulfate form of the anion-exchange material until the pH is between 3.5 and 4.5, preferably between 3.5 and 4.0. In those instances where the sol is to be used for the preparation of silica aerogels free or substantially free of salts and containing less than 0.1% by weight of electrolyte, this procedure of making the final pH adjustment of the sol without the addition of electrolytes to the sol is quite important.

When the procedure of contacting the starting hydro-organosol with the anion-exchange material and then with the cation-exchange material is used, the sol may be employed directly for those applications where a salt-free or substantially salt-free sol is required. However, if the sol has a pH below 3.0 and thus contains more mineral acid than is desirable for certain uses, it can be contacted with the anion-exchange material to adjust the pH between 3 and 4.5 or between 3.5 and 4, as required, according to the procedure given above.

If the starting acidic silica hydro-organosol contains between about 0.3 and 0.6% of a dissolved salt of an alkali metal cation and a mineral acid anion, it is usually necessary to contact such sol successively with the anion-exchange material, the cation-exchange material, the anion-exchange material and then with the cation-exchange material if a sol containing less than 0.05% by weight of dissolved salt is desired.

In another embodiment of this invention the acidic silica hydro-organosol is first contacted with the cation-exchange material. This results in the removal of metallic cations from the sol and causes a decrease in the pH of the sol which can drop to a pH of 1.8 to 2. Since the removal of metallic cations is not efficient when the initial sol is at a low pH, it is preferred in this embodiment to employ an initial sol having a pH of about 3.0 to 4.5 and to maintain contact between the sol and cation-exchanger until the pH of the sol drops below 2.5, and preferably down to about 1.8 to 2.0. At these pH values the sol is quite stable, for example, for a period of about one week or more at temperatures below 15° C., and therefore there is little danger of gelation of the sol. The resulting sol is then contacted with the sulfate form of the anion-exchange material to remove mineral acid anions from the sol. This results in an increase in the pH of the sol and it is essential that the sol be separated from the anion-exchange material before the pH exceeds 4.5 otherwise the sol is relatively unstable toward gelation and gels rather quickly even at low temperatures. The sol can be separated from the anion-exchange material at a pH between 3.0 and 4.5, and the pH of separation will depend to a large extent on the use to which the sol is put. If the sol is to be used within a relatively short period of time, for example, within 12 to 24 hours, the sol may be separated from the anion-exchange material at a pH as high as 4.5. However, if the sol is to be stored for 24 to 48 hours or more, it should be separated from the anion-exchange material at a pH of about 3.0 to 4.0.

When using the procedure described in the preceding paragraph with starting hydro-organosols containing 0.3 or more, for example, 0.3 to 0.6% of dissolved salt it is usually necessary to further contact the sol with strong cation-exchanger and the sulfate form of the anion-exchange material, after the initial treatment, if a sol containing less than 0.05% by weight of such salt is to be obtained.

In still another embodiment of this invention, the starting hydro-organosol is contacted with a mixture of the cation and anion-exchange material until all or substantially all of the residual salt in the hydro-organosol has been removed by the exchange materials. In carrying out this procedure the pH of the sol is generally within the range of 2.5 to 4.5, and contact is maintained with the mixture of exchange materials until the salt content of the sol is less than 0.05%, preferably less than 0.025%, by weight, provided that the sol is separated from the exchange materials in the event that the pH of the sol begins to rise to a value above 4.5. If the pH of the sol exceeds 4.5, the sol is apt to gel before it can be separated from the exchange materials or else has a short storage life. In this embodiment of the invention, the starting hydro-organosol is preferably passed through a mixed bed of the anion and cation-exchange materials while controlling the rate of flow of sol so as to maintain the pH of the effluent from the bed between 2.5 and 4.5, and preferably between 3.5 and 4.0 to obtain favorable ion-exchange efficiency of each exchange material. By operating in this manner, the sol obtained from the bed of exchange materials contains less than 0.05%, but preferably less than 0.025%, by weight of the salt present in the starting hydro-organosol.

When the mixed bed of exchange materials is exhausted, that is, not capable of removing further quantities of salt efficiently, it can be regenerated readily in several ways. One procedure is to first fluidize the bed by passing water upwardly through the bed to remove suspended material which may have become trapped or occluded in the bed. An aqueous solution of sulfuric acid is then passed through the mixed bed to regenerate the cation-exchange material to the hydrogen form; after which the mixed bed is washed with water to remove sulfuric acid and to regenerate the anion-exchange material to the sulfate form. Thus, the regeneration of a mixed bed is readily carried out, without separating the different exchange materials therein, by the use of a single chemical regenerant and water. Another procedure for regenerating a mixed bed of the exchange materials comprises hydraulic separation wherein the exchange materials are first suspended in water and thus separated into two different layers because of the difference in density of the anion- and cation-exchange materials. After the anion- and cation-exchange materials have been separated from each other they can be individually regenerated as hereinbefore described and then mixed together for further treatment of a starting hydro-organosol. For example, after the exchange materials are separated, the anion-exchange material can be treated with water first to regenerate it to the sulfate form, and the resulting water which is now acidic can be used to regenerate the cation-exchange material, using sufficient additional aqueous mineral acid, if necessary, to complete the regeneration. This procedure materially reduces the cost of chemical regenerant required for regeneration.

The starting hydro-organosol can be contacted with the ion-exchange materials in a variety of ways. For example, the exchange material can be added to the sol and then removed from the sol by filtration, centrifugation or the like when the desired pH has been attained, or the exchange material can be suspended in a moving stream of the sol in the form of a fluidized bed and subsequently separated from the sol, or the sol can be passed through a fixed bed of the exchange material. The latter procedure is preferred since it enables accurate and efficient control of the pH of the sol. When a fixed bed or beds of the exchange material are used, the movement of the sol through the bed may be downward or upward. However, from the standpoint of simplicity of operation, it is desirable to allow the sol to flow downwardly by gravity through the bed of exchange material, but this is not necessarily the most efficient procedure. If the hydro-organosol is cloudy or contains suspended matter, it is preferred to remove the suspended matter therefrom before passing it through a bed of the exchange material. This is suitably accomplished in the case of sols containing particles of gel or other solid matter larger than colloidal size by filtration, centrifugation or the like, and is preferably done by passing the sol through a sand filter.

Silica aerogels can be produced from the hydro-organosols from which the salt has been removed by the use of the anion and cation-exchange materials, but in some instances it is necessary to treat the sol or adjust the pH of the sol before forming the aerogels. Thus, if the pH of the sol as obtained from the exchange materials is between 3.3 and 4.0 the sol can be used directly in the production of aerogels without further treatment. On the other hand, if the pH of sol is less than 3.3, that is between about 2.0 and 3.3, it is generally necessary to treat the sol in some manner otherwise the production of an aerogel therefrom will result in excessive corrosion of the equipment used in producing an aerogel or the aerogel produced will contain more free mineral acid than is desirable, particularly when the free mineral acid is a relatively non-volatile acid such as sulfuric acid. The treatment of the sol can be effected in several ways to avoid these conditions. In one procedure, the sol is treated with a water-soluble alkaline ammonium salt such as ammonium bicarbonate to adjust the pH between 3.3 and 4.0. This procedure causes some gel particles to form in the sol which show up as white specks in the aerogel produced therefrom and hence is not as satisfactory as the other procedure described below. Although this procedure introduces some salt into the sol the ammonium salt decomposes during formation of aerogel from the sol and does not appear in the aerogel produced. In another procedure, the sol is contacted with the sulfate form of the anion-exchange materials, hereinbefore described, until the pH of the sol is between 3.3 and 4.0, after which the sol is separated from the anion-exchange material. This procedure is preferred since it provides a sol from which excellent aerogels can be produced.

In preparing silica aerogels, the sols having a pH of 3.3 to 4.0 can be charged to an autoclave and the liquid phase removed therefrom by the procedure described in the Marshall patent hereinbefore referred to. The liquid phase of the sol can also be removed continuously from the sol to form an aerogel by pumping the sol under pressure into a heated tube, the other end of which is provided with a hot let-down valve, in which tube the sol is heated to or above the critical temperature of the liquid phase of the sol, and the silica aerogel and vapors formed in the tube are released through the let-down valve and then separated from each other while preventing condensation of the vapors on the aerogel.

In general, silica aerogels are prepared from the acidic hydro-organosols having a pH of 3.3 to 4.0 and which are free or substantially free of salts by first heating such sols in a pressure-resistant vessel. When such sols are charged to a pressure-resistant vessel and then heated, the sol is first converted to a gel in situ and the removal of the liquid phase from the gel is accomplished in the same manner as in the case of an hydro-organogel, for example, as in the process of the Kistler patent hereinbefore referred to. Thus, the liquid phase is removed without subjecting the hydro-organogel formed in situ to a substantial compressive liquid solid interface.

In carrying out the removal of the liquid phase from the gel formed in situ, it is necessary to heat the gel in a closed zone or system in which the pressure may be controlled as desired, for example, in an autoclave or heated tube of the type previously described, until the temperature of the vapor of the liquid phase of the gel is near or above the critical temperature of the liquid phase. The temperature of the gel is raised until it is at least at the temperature where substantially all of the liquid phase of the gel has been converted to a vapor, and thereafter vapor can be released slowly from the closed system so as not to injure the gel structure. This temperature can be about 30° C. below the critical temperature of the liquid phase of the gel or near or at the critical temperature or above the critical temperature of the liquid phase of the gel, depending on the particular organic liquid and concentration thereof present in the liquid phase of the gel. The temperature is then maintained or raised, as desired while releasing vapor slowly until essentially all of the vapor is released from the closed system.

Although, as pointed out above, the temperature can be as much as 30° C. below the critical temperature of the liquid phase of the gel, satisfactory aerogels can be obtained at such a temperature. On the oher hand, some shrinkage of the gel does occur, and it is preferred to avoid this shrinkage by operating at least at the critical temperature of the liquid phase of the gel. Higher temperatures can also be used, for example, temperatures up to about 500° C., but it is preferred not to exceed a temperature of about 450° C.

In charging the silica hydro-organosol to the closed system prior to heating, it is desirable that the sol should occupy about 50 to 75% of the volume of the system. If the volume occupied by the sol is too small there is a tendency for excessive shrinkage during heating. On the other hand, if the volume occupied is too large, there is a danger that the vessel or autoclave used may be damaged by hydrostatic pressure.

In general, the silica aerogels prepared according to the process of this invention have physical properties which are very similar to the aerogels of the Marshall, White and Kistler patents hereinbefore referred to. However, they are distinctive from such prior art aerogels in that they are free or substantially free of salts. Thus, the silica aerogels of this invention generally contain less than 0.1% by weight of salts, whereas such prior art aerogels usually contain a minimum of 1% by weight of salts. The silica aerogels of this invention also contain small amounts of acids and/or acid alkali metal salts such as sulfuric acid and/or sodium acid sulfate uniformly distributed through the aerogel, the amounts of acid and/or salt being such as to give a pH of 3.3 to 4.0 when the aerogel is suspended in distilled water, but insufficient to provide a total electrolyte content in excess of 0.1% by weight, based on the silica aerogels. These silica aerogels are essentially the same as those described and claimed in my copending application Serial No. 547,835 previously referred to herein.

The aerogels of the present invention can be used in the normal way; that is, for thermal insulation, for flatting lacquers and varnishes, for thickening greases and the like, but they are especially useful for applications where the low electrical conductivity of such aerogels is of importance. Thus, these aerogels are particularly useful as reinforcing fillers in silicone rubbers or other rubbers, which are used as electrical insulating materials.

A further understanding of the processes of the present invention will be obtained from the following specific examples which are intended to illustrate the invention, but not to limit the scope thereof, parts and percentages being by weight unless otherwise specified.

*Example 1*

An acidic silica ethanol-aquasol at a temperature of 20° C. and having a colloidal silica content of 9.5%, a sodium sulfate content of 0.3%, an ethanol content of 50%, a water content of 40%, and containing sufficient free sulfuric acid to provide a pH of about 3.0 (glass electrode) was pumped through a sand filter to remove suspended solid particles therein and then through a column of a strong cation-exchange resin at an average rate of 130 grams per minute. This column, which was 2 inches in diameter and 34 inches high, consisted of water-insoluble beads of the hydrogen or acid form of "Dowex" 50 (a strong cation-exchange resin consisting of water-insoluble beads of a copolymer of styrene ar-ethylvinylbenzene and divinylbenzene, which copolymer contains nuclear sulfonic acid groups), which is described in Vol. 69, p. 2830, of the Journal of the American Chemical Society, having a capacity of 4.25 me. (milligram equivalents) per gram. The ethanol-aquasol was allowed to pass through the column until the composite effluent from the column had a pH of about 2.0 (glass electrode), and this composite effluent was substantially free of sodium ions.

The composite effluent from the cation-exchange resin was next passed downwardly through a column of anion-exchange material in sulfate form at an average rate of 130 grams per minute. This column, which was 2 inches in diameter and 34 inches higher, consisted of water-insoluble beads of the sulfate form of a strongly basic quaternary ammonium anion-exchange resin composed of the reaction product of trimethylamine and a chloromethylated copolymer of about 87% by weight of styrene, 5% by weight of ethylvinylbenzene and 8% by weight of divinyl benzene, immersed in sufficient water to cover the beads. The anion-exchange material had a capacity of about 1.69 me. per gram. Samples of the effluent from the anion-exchange column were analyzed for sulfate ion periodically by titrating the sample with a solution of known concentration of barium perchloride in isopropanol using thorin as an indicator for excess barium ions. During the major part of the run through this column, the sulfate content of the effluent was about 0.0005% calculated as $Na_2SO_4$, and the specific conductance at 20° C. of the effluent from the column at the beginning of the run was 56 μmhos. As the point of exhaustion of the anion-exchange column was reached, the sulfate content, calculated as $Na_2SO_4$, of the entire collected effluent increased to 0.0024%, and the specific conductance at 20° C. was 93 μmhos. At this stage the pH (glass electrode) of the total effluent was about 4.0. Collection of composite effluent and flow of the hydro-organosol through the column was then discontinued. The composite effluent was an acidic silica water-alcohol sol (alcosol) having a pH of about 4, due primarily to a small residual amount of sulfuric acid and $NaHSO_4$, and contained less than 0.01% by weight of $Na_2SO_4$, but otherwise had the same composition as the starting sol. This composite effluent remained in a fluid, pumpable condition for at least 24 hours at a temperature of 20 to 30° C.

The anion-exchange material used, which had been converted in part to the bisulfate form, was regenerated by first passing natural water having a hardness of 30 p.p.m., calculated as $CaCO_3$, upwardly through the column at a rate sufficient to fluidize the resin particles so as to remove trapped or occluded suspended material, and then continuing the treatment of the material with additional amounts of such natural water until no turbidity can be detected in the wash water effluent upon the addition of two drops of 1 molar barium chloride solution to 5 milliliters of such effluent.

The anion-exchange column may be used to remove sulfate ions from the acidic silica hydro-organosols and then regenerated with water for four or five cycles without any appreciable effect on the exchange capacity of such column.

*Example 2*

An acidic silica ethanol-aquasol at a temperature of 20° C. and having a colloidal silica content of 9.5%, a sodium sulfate content of 0.2%, an ethanol content of 50%, a water content of 40% and 0.038 N in sulfuric acid content was pumped through a sand filter to remove suspended solid particles therein and then downwardly through a column of an ion-exchange material in the sulfate form at an average rate of 130 grams per minute. This column, which was 2 inches in diameter and 35 inches high, consisted of water-insoluble granules of the sulfate form of a strongly basic quaternary ammonium anion-exchange resin composed of the reaction product of trimethylamine and a chlorethylated copolymer of about 87% by weight of styrene, 5% by weight of ethyl vinylbenzene and 8% by weight of divinylbenzene, immersed in sufficient water to cover the granules. This anion-exchange material had a capacity of about 1.69 me. per gram. The effluent from the anion-exchange was maintained at a pH of 4.5 or less by controlling the flow rate and was collected in a single container, and as soon as the pH of the effluent began to fall below 3.0, the effluent from the column was diverted to another container and the supply of the starting sol to the column was discontinued. The entire effluent collected up to this stage was collected in the first-mentioned container and was subsequently passed through a cation-exchange column as described in the following paragraph. The anion-exchange column which had partially been converted to the bisulfate form by the above process was regenerated by first passing natural water having a hardness of 30 p.p.m., calculated as $CaCO_3$, upwardly through the column at a rate sufficient to fluidize the resin granules so as to remove trapped or occluded suspended material, and then continuing the treatment of the material with additional amounts of such natural water until no turbidity could be detected in the wash water effluent upon the addition of two drops of 1 molar barium chloride solution to 5 milliliters of such effluent. The water employed to regenerate the anion-exchange material contained sulfuric acid and can be used with additional sulfuric acid, if necessary, to regenerate the cation-exchange resin referred to below.

The effluent sol from the anion-exchange column having a pH of 4.5 or less was passed downwardly through a column, 2 inches in diameter and 38 inches high, consisting of water-insoluble beads of the hydrogen or acid form of "Dowex" 50 (a strong cation-exchange resin consisting of water-insoluble beads of a copolymer of styrene, ar-ethyl vinylbenzene and divinylbenzene, which copolymer contained nuclear sulfonic acid groups) which is described in vol. 69, p. 2830, of the Journal of the American Chemical Society, having a capacity of 4.25 me. per gram. The sol was allowed to pass through the cation-exchange column until the composite effluent from the column had a pH (glass electrode) of 2.3 and a specific resistivity less than 1900 ohms, indicating that a relatively large quantity of sulfuric acid was present in the effluent sol.

If the amount of sulfuric acid in the effluent sol is objectionable for some reason, some of this acid can be removed by the following procedure. First, the effluent sol is passed downwardly through a column of anion-exchange material in the sulfate form, using the sulfate form of the anion-exchange material as described in the first paragraph of this example. The effluent from this column is maintained at a pH (glass electrode) between 3.5 and 4 by controlling the rate of flow of sol through the column. As the pH of the effluent falls below 3.0, the flow is diverted to another container and flow of sol through the column is discontinued. The composite effluent collected up to this stage has a pH between 3.5 and 4 and contains less than 0.01% of sulfate calculated as $Na_2SO_4$, but otherwise has the same composition as the starting sol. This composite effluent remains in a fluid, pumpable condition for at least 24 hours at a temperature of 20 to 30° C.

*Example 3*

An acidic silica ethanol-aquasol at a temperature of 20° C. and having a colloidal silica content of 9.5%, a sodium sulfate content of 0.3%, an ethanol content of 50%, a water content of 40% and 0.038 N in sulfuric acid content was pumped through a sand filter to remove suspended solid particles therein and then downwardly through a column of an anion-exchange material in the sulfate form at an average rate of 10 milliliters per minute. This column, which was 1.2 centimeters in diameter and 36 centimeters high, consisted of water-insoluble granules of the sulfate form of a weakly basic anion-exchange resin composed of the reaction product of diethylene triamine and a chlormethylated copolymer of about 87% of styrene, 5% of ethyl vinylbenzene and 8% divinyl benzene, immersed in sufficient water to cover the granules. This anion-exchange material had a capacity in excess of 0.75 me. per gram. The effluent from the column had a pH between 3.1 and 3.4 and contained very small amounts of sulfuric acid until a total of about 625 milliliters of effluent had been collected. The flow of sol through the column was then discontinued, and the column was regenerated to the sulfate form using distilled water and the procedure described in the third paragraph of Example 1.

The composite effluent from the anion-exchange column was next passed downwardly through a column of the hydrogen form of a strong cation-exchange material, the same as described in the second paragraph of Example 2. This column was 1.2 centimeters in diameter and 36 centimeters high, and the composite effluent was passed through this column at an average rate of 10 milliliters per minute. The effluent from the cation-exchange column was collected in a single container until the composite effluent had a pH of 2.3 at which stage it contained less than 0.01% of sulfate, calculated as $Na_2SO_4$, but otherwise had the same composition as the starting sol. This composite effluent remained in a fluid, pumpable state for at least 24 hours at a temperature of 20 to 30° C.

*Example 4*

An acidic silica ethanol-aquasol at a temperature of 20° C. and having a colloidal silica content of 9.5%, a sodium sulfate content of 0.3%, an ethanol content of 50%, a water content of 40%, and containing from sulfuric acid sufficient to provide a pH of about 3.0 (glass electrode), was pumped through a sand filter to remove suspended solid particles therein and then downwardly through a column of a mixed bed of the hydrogen form a strong cation-exchange material and the sulfate form of an anion-exchange material at an average rate of 130 grams per minute. This column, which was 2 inches in diameter and 78 inches high, contained a mixture of equal dry weights of particles of each exchange material which were mixed as uniformly as possible, immersed in sufficient water to cover the particles. The cation-exchange material consisted of water-insoluble beads of the hydrogen form of "Dowex" 50 (a strong cation-exchange resin consisting of water-insoluble beads of a copolymer of styrene, ar-ethyl vinylbenzene and divinylbenzene, which copolymer contained nuclear sulfonic acid groups) which is described in Volume 69, p. 2830, of the Journal of the American Chemical Society, having a capacity of 4.25 me. per gram. The anion-exchange material consisted of water-insoluble granules of the sulfate form of a strongly basic quaternary ammonium anion-exchange resin composed of the reaction product of trimethylamine and a chlormethylated copolymer of about 87% styrene, 5% ethyl vinylbenzene and 8% divinylbenzene. This anion-exchange material had a capacity of 1.69 me. per gram. The flow of the sol through the column was controlled so that the pH (glass electrode) of the effluent from the column was maintained between 3 and 4. When the specific conductance of the composite effluent rose to 90 $\mu$mhos at 20° C. the flow of sol through the column was discontinued and the remaining sol in the column was collected in a separate container. The composite effluent contained less than 0.01% of sulfate, calculated as sodium sulfate, and remained fluid and pumpable for at least 24 hours at a temperature of 20 to 30° C.

The column was regenerated by first passing demineralized water upwardly through the column at a rate sufficient to fluidize the exchange resin particles so as to remove trapped or occluded suspended material. A dilute aqueous solution of sulfuric acid was then passed downwardly through the column until the cation-exchange resin particles were regenerated to the hydrogen form, after which demineralized water was passed downwardly through the column until the anion-exchange material was regenerated to the sulfate form as evidenced by lack of turbidity of the effluent from the column upon the addition of 2 drops of 1 molar barium chloride solution to 5 milliliters of effluent.

*Example 5*

An acidic silica ethanol-aquasol prepared at 10° C. and having a colloidal silica content of 10.5%, a sodium sulfate content of about 5.5%, an ethanol content of 40% and the remainder consisting of water and sufficient sulfuric acid to provide a pH of about 3.0 was refrigerated for 16 hours at 0° C. during which time a substantial amount of the sodium sulfate therein had crystallized as $Na_2SO_4 \cdot 10H_2O$. The sol was then filtered at 0° C. to remove the sodium sulfate crystals, and the filtered sol contained about 0.16% $Na_2SO_4$. This filtered sol was then treated to remove substantially all of this residual sodium sulfate using the procedures and exchange resins described in the first two paragraphs of Example 1. The resulting sol which had a pH of about 3.5 (glass electrode) and contained about 0.003% of sulfate calculated as $Na_2SO_4$ was charged to an autoclave while it was still fluid until it occupied about 75% of the volume of the autoclave. The autoclave was then closed and heated until a pressure of 1900 pounds per square inch (gauge) was attained, which pressure was slightly above the critical pressure, during which time the sol was converted to an ethanol-aquasol in situ. Heating of the autoclave was continued and ethanol-water vapor was released intermittently from the autoclave to maintain the pressure at 1900 pounds per square inch (gauge) until a temperature of 300° C. was attained, which was above the critical temperature. The vapor in the autoclave was released slowly and the autoclave was then cooled. A silica aerogel of excellent quality was recovered from the autoclave. The specific conductance of a slurry of 5 grams of the aerogel in 395 grams of distilled water was 7.4 $\mu$mhos at 25° C., which corresponds to a sodium sulfate content of 0.03%.

*Example 6*

Experiments were carried out as described in Examples 1 through 5 with the exception that the starting sols contained acetone instead of ethanol, but were otherwise identical with the starting sols of the preceding examples. After treatment with the cation-exchange materials and anion-exchange materials, the acidic silica acetone-aquasols contained less than 0.01% of electrolyte equivalent to sodium sulfate. Also the silica arerogel prepared from the treated acidic silica acetone-aquasol was comparable in quality to that prepared in accordance with Example 5, and contained less than 0.1% of electrolyte calculated as $Na_2SO_4$.

Of the water-insoluble strong cation-exchange materials the preferred are the water-insoluble sulphonated polymerizates particularly the sulphonated polymerizate of a mixture of a poly-vinyl aryl compound (e.g. the divinyl benzenes, the divinyl toluenes, the divinyl xylenes, the divinyl ar-ethyl benzenes, the divinyl chlorobenzenes, the divinyl-phenyl vinyl ethers, and the like) and a mono-vinyl aryl compound (e.g. styrene, the vinyl toluenes, the vinyl naphthalenes, the vinyl ar-ethyl benzenes, alpha-methyl styrene, the vinyl chlorobenzenes, the vinyl xylenes, and the like). Thes materials are well described as is their mode of preparation in U.S. 2,366,007 and U.S. 2,466,675. In sulphonating the polymerizates of a poly-vinyl aryl compound and a mono-vinyl aryl compound various sulphonating agents can be used such as sulfur trioxide, oleum and chlorosulfonic acid. To illustrate their preparation is the following:

30 parts by weight of a finely divided polymerizate obtained by polymerizing a mixture of 90 parts by weight of styrene and 10 parts by weight of divinyl benzene is refluxed with 176 parts by weight of chlorosulphonic acid for a few minutes and then the mass is permitted to stand for about two days at room temperature. The reaction mass is then washed with water, filtered and dried. The dried product contained an average of 1.77 sulphonic acid groups per aryl nucleus.

Other water-insoluble strong cation exchange materials are the water-insoluble phenol-formaldehyde resins having sulfonic acid groups attached to the aryl and/or the methylene nucleus obtained by condensing formaldehyde with phenolsulphonic acid and by sulfonating a phenolformaldehyde resin or other resins of formaldehyde and hydroxy substituted aromatic hydrocarbons. These materials and the preparation of same are described in U.S. 2,466,675 and U.S. 2,477,328.

This preferred group, i.e. sulphonated polymerizate, of water-insoluble strong cation exchange resins of the process of this invention are described also in Robert Kunin's "Ion Exchange Resins" Second Edition, published by John Wiley and Sons, Inc., New York, as well as other water-insoluble strong cation exchange resins useful in the process of this invention.

This application is a continuation-in-part of co-pending application Serial No. 640,587, filed February 18, 1957, now abandoned.

What is claimed is:

1. A process of decreasing the salt content of an acidic silica hydro-organosol which comprises contacting at a temperature below 30° C. an acidic silica hydroorganosol containing water, from about 5 to 12% by weight of silica as silicic acid, from about 25 to 60% by weight of a substantially neutral water-miscible organic liquid consisting of carbon, hydrogen and oxygen atoms, at least 0.1% by weight of a salt of a mineral acid and a water-soluble alkali silicate and a mineral acid in an amount sufficient to provide a pH of 1.8 to 4.5, with the hydrogen form of a water-insoluble strong cation-exchange material and the sulfate form of a water-insoluble anion-exchange material containing salt-forming nitrogen atoms, until the hydro-organosol contains less than 0.05% by weight of said salt, said hydro-organosol being removed from contact with said anion-exchange material before the pH of the sol exceeds 4.5.

2. A process of decreasing the sodium sulfate content of an acidic silica hydro-organosol which comprises contacting at a temperature below 30° C. an acidic silica hydro-organosol containing water, at least 0.1% by weight of sodium sulfate, from about 5 to 12% by weight of silica as silicic acid from about 25 to 60% by weight of a substantially neutral water-miscible organic liquid consisting of carbon, oxygen and hydrogen atoms, and an amount of sulfuric acid to provide a pH between about 2 to 4.5 with the hydrogen form of a water-insoluble strong cation-exchange sulfonated polymerizate and the sulfate form of a water-insoluble anion-exchange material containing salt-forming nitrogen atoms, until the hydro-organosol contains less than 0.025% by weight of sodium sulfate, said hydro-organosol being removed from contact with said anion-exchange material before the pH of said sol exceeds 4.5.

3. A process of decreasing the sodium sulfate content of an acidic silica hydro-organosol which comprises contacting at a temperature below 30° C. an acidic silica hydro-organosol containing from about 0.1 to 0.6% by weight of sodium sulfate, from about 5 to 12% by weight of silica as silicic acid, from about 25 to 60% by weight of a substantially neutral water-miscible organic liquid having a boiling point below that of water at atmospheric pressure and consisting of carbon, hydrogen and oxygen atoms, the remainder of the sol consisting substantially of water and sulfuric acid in an amount sufficient to provide a pH between about 2 and 4, with the hydrogen form of a water-insoluble strong cation-exchange material to remove substantially all of the sodium ions of the sodium sulfate from the sol, thereby obtaining a hydro-organosol having a pH between about 1.8 and 2.5, and thereafter contacting the resulting sol at a temperature below 30° C. with the sulfate form of a water-insoluble anion-exchange material containing salt-forming nitrogen atoms to remove substantially all of the sulfate ions corresponding to the amount present in said sodium sulfate, and removing said sol from contact with said anion-exchange material while the pH of the sol is between 3.0 and 4.0, said sol so produced being characterized by a sodium sulfate content of less than 0.025% by weight.

4. A process as in claim 3, but further characterized in that said anion-exchange material is the sulfate form of a strongly basic quaternary ammonium anion-exchange resin.

5. A process as in claim 4, but further characterized in that the organic liquid present in the sol is ethanol.

6. A process as in claim 4, but further characterized in that the organic liquid present in the sol is acetone.

7. A process as in claim 4, but further characterized in that the cation-exchange material is a sulfonated polymerizate of a poly-vinyl aryl compound and a mono-vinyl aryl compound.

8. A process of decreasing the sodium sulfonate content of an acidic silica hydro-organosol which comprises passing an acidic silica hydro-organosol at a temperature below 30° C. and containing from about 0.1 to 0.6% by weight of sodium sulfate, from about 5 to 12% by weight of silica as silicic acid, from about 25 to 60% by weight of a substantially neutral water-miscible organic liquid having a boiling point below that of water at atmospheric pressure and consisting of carbon, hydrogen and oxygen atoms, the remainder of the sol consisting substantially of water and sulfuric acid in an amount to provide a pH of about 2 to 4, through a mixed bed of the hydrogen form of a strong cation-exchange material and the sulfate form of a water-insoluble anion-exchange material containing salt-forming nitrogen atoms and controlling the rate of flow of said sol through said bed to provide an effluent having a pH between about 2.5 and 4.0, whereby a hydro-organosol is obtained which contains less than 0.025% by weight of sodium sulfate.

9. A process as in claim 8, but further characterized in that said anion-exchange material is the sulfate form of a strongly basic quaternary ammonium anion-exchange resin.

10. A process as in claim 9, but further characterized in that the organic liquid present in the sol is ethanol.

11. A process as in claim 9, but further characterized in that the organic liquid present in the sol is acetone.

12. A process as in claim 9, but further characterized in that the cation exchange material is a sulfonated polymerizate of a poly-vinyl aryl compound and a mono-aryl compound.

13. A process of decreasing the sodium sulfate content of an acidic silica hydro-organosol which comprises contacting an acidic silica hydro-organosol at a temperature below 30° C. and containing from about 0.1 to 0.6% by weight of sodium sulfate, from about 5 to 12% by weight of silica acid, from about 25 to 60% by weight of a substantially neutral water-miscible organic liquid having a boiling point below that of water at atmospheric pressure and consisting of carbon, hydrogen and oxygen atoms, the remainder of the sol consisting substantially of water and sulfuric acid in an amount to provide a pH of about 1.8 to 3.5, with the sulfate form of a water-insoluble anion-exchange material containing salt-forming nitrogen atoms until the pH of the sol does not exceed 4.5, and thereafter contacting said sol at a temperature below 30° C. and before appreciable change in the viscosity occurs with the hydrogen form of a water-insoluble strong cation-exchange material until substantially all of the sodium ions are removed from said sol and said sol has a pH between about 1.8 and 3.3, said sol so prepared being characterized by a sodium sulfate content of less than 0.025% by weight.

14. A process of decreasing the salt content of an acidic hydro-organosol which comprises contacting at a temperature below 30° C. an acidic hydro-organosol containing water, from about 5 to 12% by weight of silica as silicic acid, from about 25 to 60% by weight of a substantially neutral water-miscible organic liquid consisting of carbon, oxygen and hydrogen atoms, at least 0.1% by weight of salt of a mineral acid and an alkali silicate and a mineral acid in an amount sufficient to provide a pH of 1.8 to 4.5, with the hydrogen form of a water-insoluble strong cation-exchange material and the sulfate form of a water-insoluble anion-exchange material containing salt-forming nitrogen atoms, until the hydro-organosol contains less than 0.025% by weight of said salt, said hydro-organosol being removed from contact with said anion-exchange material before the pH of the sol exceeds 4.5, treating the resulting anion-exchange material with water until it is regenerated to the sulfate form and treating the cation-exchange material with the resulting water to at least partially regenerate said cation-exchange material to the hydrogen form and thereafter contacting additional quantities of said first mentioned acidic silica hydro-organosol with said regenerated, cation-exchange material and said regenerated anion-exchange material in accordance with the aforedescribed process.

15. A process as in claim 14, but further characterized in that the anion-exchange material employed is the sulfate form of a water-insoluble strongly basic quaternary ammonium anion-exchange resin and the cation exchange material is the sulfonated polymerizate of a poly-vinyl aryl compound and a mono-vinyl aryl compound.

16. A process of decreasing the salt content of an acidic silica hydro-organosol which comprises passing at a temperature below 30° C. an acidic silica hydro-organosol containing water, from about 5 to 12% by weight of silica as silicic acid, from about 25 to 60% by weight of a substantially neutral water-miscible organic liquid consisting of carbon, oxygen and hydrogen atoms at least 0.1% by weight of a salt of a mineral acid and an alkali silicate and a mineral acid in an amount sufficient to provide a pH of 1.8 to 4.5, through a mixed bed of the hydrogen form a water-insoluble, strong cation-exchange material and the sulfate form of a water-insoluble anion-exchange material containing salt-forming nitrogen atoms and controlling the rate of flow of said sol through said mixed bed to provide an effluent having a pH between about 2.5 to 4.0, whereby a hydro-organosol is obtained which contains less than 0.025% by weight of sodium sulfate, treating the mixed bed of said exchange material with an aqueous sulfuric acid solution to regenerate said cation-exchange material and thereafter treating said mixed bed with water to regenerate the anion-exchange material therein to the sulfate form and thereafter contacting an acidic silica hydro-organosol of the same composition as said first mentioned acidic silica hydro-organosol with a mixture of said regenerated anion-exchange material and said regenerated cation-exchange material in accordance with the aforedescribed process.

References Cited in the file of this patent

UNITED STATES PATENTS

| 2,244,325 | Bird | June 3, 1941 |
| 2,285,449 | Marshall | June 9, 1942 |
| 2,377,842 | Marshall | June 5, 1945 |
| 2,577,484 | Rule | Dec. 4, 1951 |
| 2,772,237 | Bauman et al. | Nov. 27, 1956 |

FOREIGN PATENTS

| 611,914 | Great Britain | Nov. 5, 1948 |

UNITED STATES PATENT OFFICE
CERTIFICATE OF CORRECTION

Patent No. 3,051,657                  August 28, 1962

Wilson H. Power

It is hereby certified that error appears in the above numbered patent requiring correction and that the said Letters Patent should read as corrected below.

Column 18, line 55, for "sulfonate" read -- sulfate --; column 19, line 33, after "acidic" insert -- silica --; column 20, line 23, after "form" insert -- of --.

Signed and sealed this 26th day of March 1963.

(SEAL)
Attest:

ESTON G. JOHNSON                  DAVID L. LADD

Attesting Officer                  Commissioner of Patents